US012763685B2

(12) United States Patent
Mei

(10) Patent No.: US 12,763,685 B2
(45) Date of Patent: Oct. 13, 2026

(54) APPARATUS TO CHARGE BOOTSTRAP CAPACITOR

(71) Applicant: TEXAS INSTRUMENTS INCORPORATED, Dallas, TX (US)

(72) Inventor: Tawen Mei, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 235 days.

(21) Appl. No.: 18/477,979

(22) Filed: Sep. 29, 2023

(65) Prior Publication Data

US 2025/0112637 A1 Apr. 3, 2025

(51) Int. Cl.

*H02M 1/08* (2006.01)
*H02M 3/07* (2006.01)
*H02M 3/156* (2006.01)

(52) U.S. Cl.

CPC ............. *H02M 3/156* (2013.01); *H02M 1/08* (2013.01); *H02M 3/07* (2013.01)

(58) Field of Classification Search

CPC ........... H02M 1/08; H02M 3/07; H02M 3/156
See application file for complete search history.

(56) References Cited

U.S. PATENT DOCUMENTS

2024/0030812 A1* 1/2024 D'Souza ................. H02M 1/08
2024/0048048 A1* 2/2024 Zhang ................... H02M 3/158
2024/0333154 A1* 10/2024 Mei ..................... H02M 1/0009

OTHER PUBLICATIONS

Texas Instruments; "LM22673/-Q1 42 V, 3 A Simple Switcher, Step-Down Voltage Regulator with Features". Published Sep. 2008.
Texas Instruments; "LM43603 3.5-V to 36-V, 3A Synchronous Step-Down Voltage Converter". Published Apr. 2014.

* cited by examiner

*Primary Examiner* — Patrick O Neill
(74) *Attorney, Agent, or Firm* — Charles F. Koch

(57) ABSTRACT

In some aspects, an integrated circuit comprises an input voltage terminal, a capacitor terminal, a first NMOS transistor connected to the input voltage terminal, a first PMOS transistor connected to a first NMOS gate terminal of the first NMOS transistor and connected to the capacitor terminal, the first PMOS transistor having a first PMOS gate terminal, a second PMOS transistor connected to the first NMOS gate terminal of the first NMOS transistor, the second PMOS transistor having a second PMOS gate terminal, a switched output terminal, a second NMOS transistor connected to the switched output terminal, a third NMOS transistor connected to the switched output terminal, an inverter, and a complementary metal oxide semiconductor (CMOS) transistor pair, the CMOS transistor pair having an input connected to the third NMOS transistor and an output connected to a second PMOS gate terminal of the second PMOS transistor.

20 Claims, 6 Drawing Sheets

500

APPARATUS TO CHARGE BOOTSTRAP CAPACITOR

BACKGROUND

Direct current (DC) to DC converters can be used to perform various functions in electronics circuits such as voltage stepping up/down, voltage regulation, etc. A pulse width modulation (PWM) signal may be used to control operation of one or more switches within the DC-to-DC converter, whereby an output voltage of the DC-to-DC converter depends on an input voltage of the DC-to-DC converter and a switching frequency. A capacitor, which can be referred to as a bootstrap capacitor, can be charged to provide a voltage sufficient to drive a gate of a n-channel field-effect transistor (NFET), which can serve as a high-side switch for a converter.

SUMMARY

In some aspects, an integrated circuit comprises an input voltage terminal, a capacitor terminal, a first N-channel metal-oxide semiconductor (NMOS) transistor connected to the input voltage terminal, a first P-channel metal-oxide semiconductor (PMOS) transistor connected to a first NMOS gate terminal of the first NMOS transistor and connected to the capacitor terminal, the first PMOS transistor having a first PMOS gate terminal, a second PMOS transistor connected to the first NMOS gate terminal of the first NMOS transistor, the second PMOS transistor having a second PMOS gate terminal, a switched output terminal, a second NMOS transistor connected to the switched output terminal, a third NMOS transistor connected to the switched output terminal, an inverter, the inverter having an inverter input connected to a second NMOS gate terminal of the second NMOS transistor and an output connected to a third NMOS gate terminal of the third NMOS transistor, and a complementary metal oxide semiconductor (CMOS) transistor pair, the CMOS transistor pair having an input connected to the third NMOS transistor and an output connected to a second PMOS gate terminal of the second PMOS transistor, the CMOS transistor pair connected to the capacitor terminal and to the switched output terminal.

DETAILED DESCRIPTION

Figure 1:
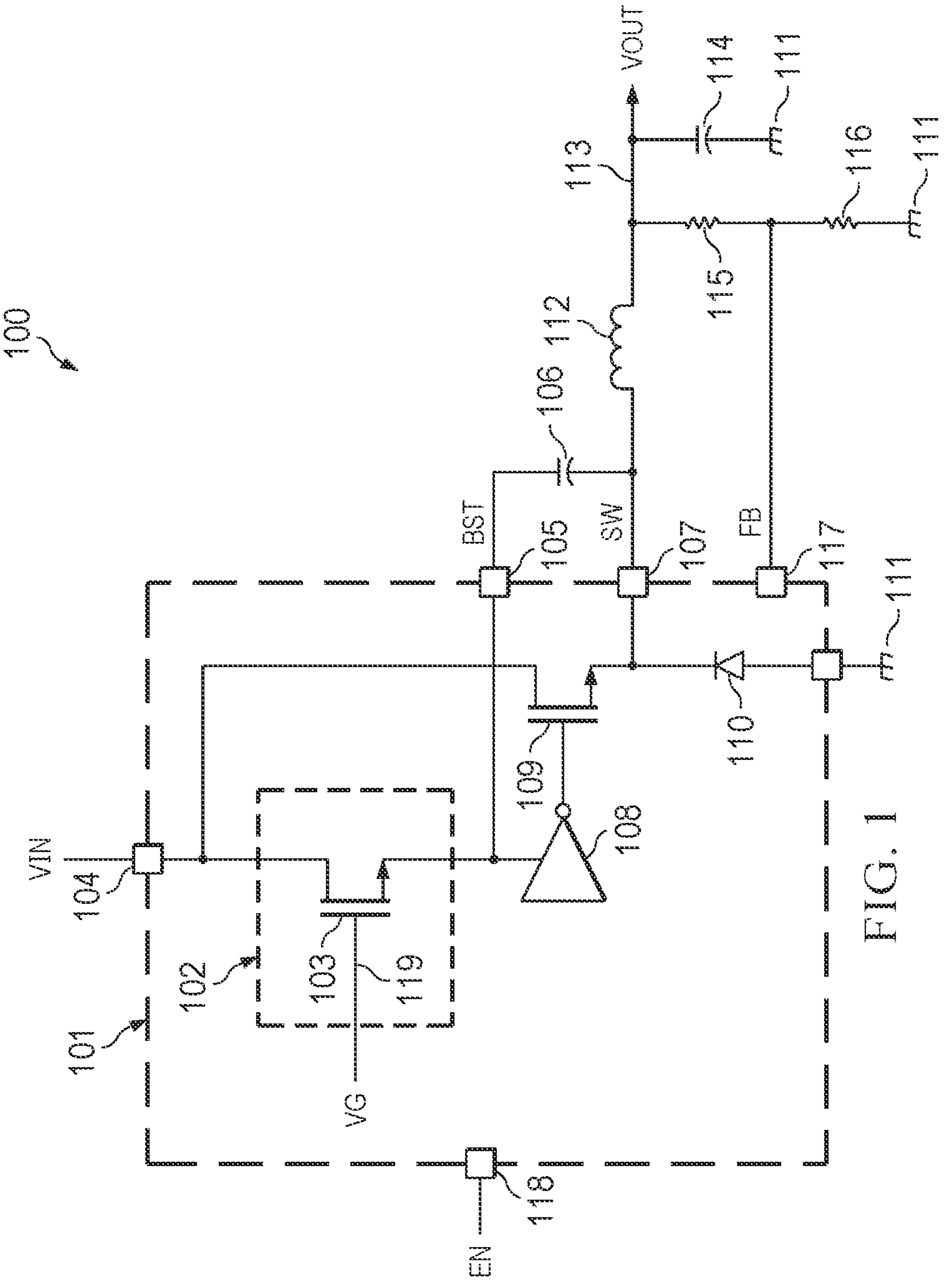
FIG. 1 is a schematic diagram illustrating an apparatus in accordance with some aspects of the present disclosure.

The drawings are not drawn to scale.

Direct current (DC) to DC converters are utilized in a wide variety of electronic circuits due to their ability to step up/down and regulate DC voltages. DC-to-DC converter may comprise a voltage input, inductor, capacitor, and one or more switches. During operation, the one or more switches are opened and closed at a high frequency; the operation of the one or more switches is used to control current paths within the converter and charge/discharge the inductor and the capacitor. An output voltage is generated across the capacitor based on a switching frequency and a topology of the DC-to-DC converter. DC-to-DC converters may come in a variety of topologies that provide a variety of relationships between the voltage of the input and the output, where the placement of the voltage input, inductor, capacitor, and one or more switches varies based on the topology.

A switch may be provided between a positive voltage source and a terminal to which an inductor may be connected to selectively apply a connection of the positive voltage source to the inductor. Such a switch can be referred to as a high-side switch. It can be advantageous to use an n-channel field-effect transistor (NFET), such as an n-channel laterally diffused metal oxide semiconductor (NLDMOS) field-effect transistor (FET), as a high-side switch. An NFET is controlled by a more positive control voltage applied to its gate terminal. To provide a sufficiently high positive voltage to drive the gate terminal of an NFET used as a high-side switch, for example, a voltage higher than the converter's input voltage, a circuit with a capacitor and a capacitor charging path can be used to charge the capacitor to a voltage, and the connections of the capacitor can be switched to add the voltage of the capacitor to the converter's input voltage to obtain a voltage higher than the converter's input voltage. Such a capacitor can be referred to as a bootstrap capacitor. The capacitor can be recharged during the high-side switch's off-time. The circuit for charging the capacitor can be referred to as an apparatus for charging a bootstrap capacitor for a switching direct-current-to-direct-current (DC-DC) converter integrated circuit. The less area such a charging circuit occupies and the least costly such a charging circuit can be implemented, the more advantageous such a charging circuit can be.

Transistors capable of withstanding higher voltages are often larger than transistors designed for lower voltages. Since transistors in a charging path conduct the charging current, which can be substantial, transistors passing the charging current are often larger than lower-current transistors. Accordingly, a capacitor charging circuit implemented with fewer high-voltage transistors in the charging path can occupy less area than a circuit with more high-voltage transistors in the charging path. As disclosed herein, it is possible to provide a capacitor charging circuit having a single high-voltage transistor in the charging path. Such a single high-voltage transistor can withstand a full range of input voltage while passing the charging current and can reduce the area occupied as compared with circuits having additional high-voltage transistors.

The gate terminal of an NFET in the charging path can be switched to a reference voltage VG when on and can be tied to its source terminal to be turned off. The voltage provided at a VG terminal can be part of a closed loop circuit regulating the bootstrap capacitor voltage. Accordingly, high overdrive of the gate terminal of the NFET can be provided, allowing the NFET to be placed in its triode region for full conduction. As another example, the voltage at the VG terminal can be a fixed voltage to simplify the overall circuitry.

In an implementation where a single high-voltage device is present in the path between the input voltage and the bootstrap capacitor, the circuit can be smaller in the area it occupies on an integrated circuit die, increasing power density. Also, a terminal for an intermediate supply voltage, VCC, and a capacitor connected to the VCC terminal can be avoided, reducing cost and complexity.

As used herein, a "low-voltage" transistor has a maximum tolerable drain-to-source voltage (VDS) rating of less than 20 volts, of less than 15 volts, of less than 10 volts, or of five or fewer volts. As used herein, a "high-voltage" transistor has a maximum VDS rating of more than five volts, of at least 10 volts, of at least 15 volts, of at least 20 volts, of at least 30 volts, or of at least 40 volts.

FIG. 1 is a schematic diagram illustrating an apparatus in accordance with some aspects of the present disclosure. Apparatus 100 comprises integrated circuit 101, capacitor 106, inductor 112, resistor 115, resistor 116, and capacitor 114. Integrated circuit 101 comprises input voltage (VIN) terminal 104, ground terminal 111, bootstrap (BST) output terminal 105, and switched (SW) output terminal 107. Enable (EN) terminal 118 and feedback (FB) terminal 117 may also be provided. An input voltage is applied to VIN terminal 104, which is connected to a switch of capacitor charging circuit 102 and to a switch for switching SW output terminal 107. As an example, the switch of capacitor charging circuit 102 (e.g., a bootstrap capacitor charging circuit) can be an n-channel field-effect transistor (NFET) 103. VIN terminal 104 can be connected to a drain terminal of NFET 103. As an example, the switch for switching SW output terminal 107 can be NFET 109. VIN terminal 104 can be connected to a drain terminal of NFET 109. A charging control voltage can be applied to a charging control (VG) terminal 119. VG terminal 119 can be connected to the switch of capacitor charging circuit 102. As an example, VG terminal 119 can be connected to a gate terminal of NFET 103. The switch of the capacitor charging circuit 102 is connected to BST output terminal 105 and to driver 108. As an example, a source terminal of NFET 103 can be connected to BST output terminal 105 and to driver 108. The connection to driver 108 can, for example, be a connection to a supply voltage terminal of driver 108. As an example, driver 108 can be an inverter. An output of driver 108 is connected to a control terminal of the switch for switching SW output terminal 107. As an example, an output of driver 108 can be connected to a gate terminal of NFET 109. The switch for switching SW output terminal 107 is connected to SW output terminal 107. As an example, a source terminal of NFET 109 is connected to SW output terminal 107. SW output terminal 107 is connected to a cathode terminal of diode 110. An anode terminal of diode 110 is connected to ground terminal 111.

Capacitor 106 is connected between BST output terminal 105 and SW output terminal. A first terminal of inductor 112 is connected to SW output terminal 107. A second terminal of inductor 112 is connected to output voltage (VOUT) terminal 113. VOUT terminal 113 is connected to a first terminal of resistor 115 and to a first terminal of capacitor 114. A second terminal of capacitor 114 is connected to ground terminal 111. A second terminal of resistor 115 is connected to feedback (FB) terminal 117 and to a first terminal of resistor 116. A second terminal of resistor 116 is connected to ground terminal 111.

Capacitor charging circuit 102 selectively provides a bootstrap output voltage at BST output terminal 105 to charge capacitor 106. At some point, driver 108 can use the elevated voltage at BST output terminal 105 to drive the gate terminal of NFET 109 to cause NFET 109 to conduct, which pulls SW output terminal 107 up to a voltage near the input voltage at VIN terminal 104. Since capacitor 106 has already been charged, bringing SW output terminal 107 up to a voltage near the input voltage at VIN terminal 104 brings the voltage at BST output terminal 105 up to voltage near the sum of the input voltage at VIN terminal 104 and the voltage across capacitor 106. That voltage at BST output terminal 105 well above the input voltage at VIN terminal 104 allows driver 108 to provide a voltage to the gate terminal of NFET 109 sufficiently high to maintain conduction of NFET 109 even as the voltage at SW output terminal 107 rises to near the input voltage at VIN terminal 104.

Figure 2:
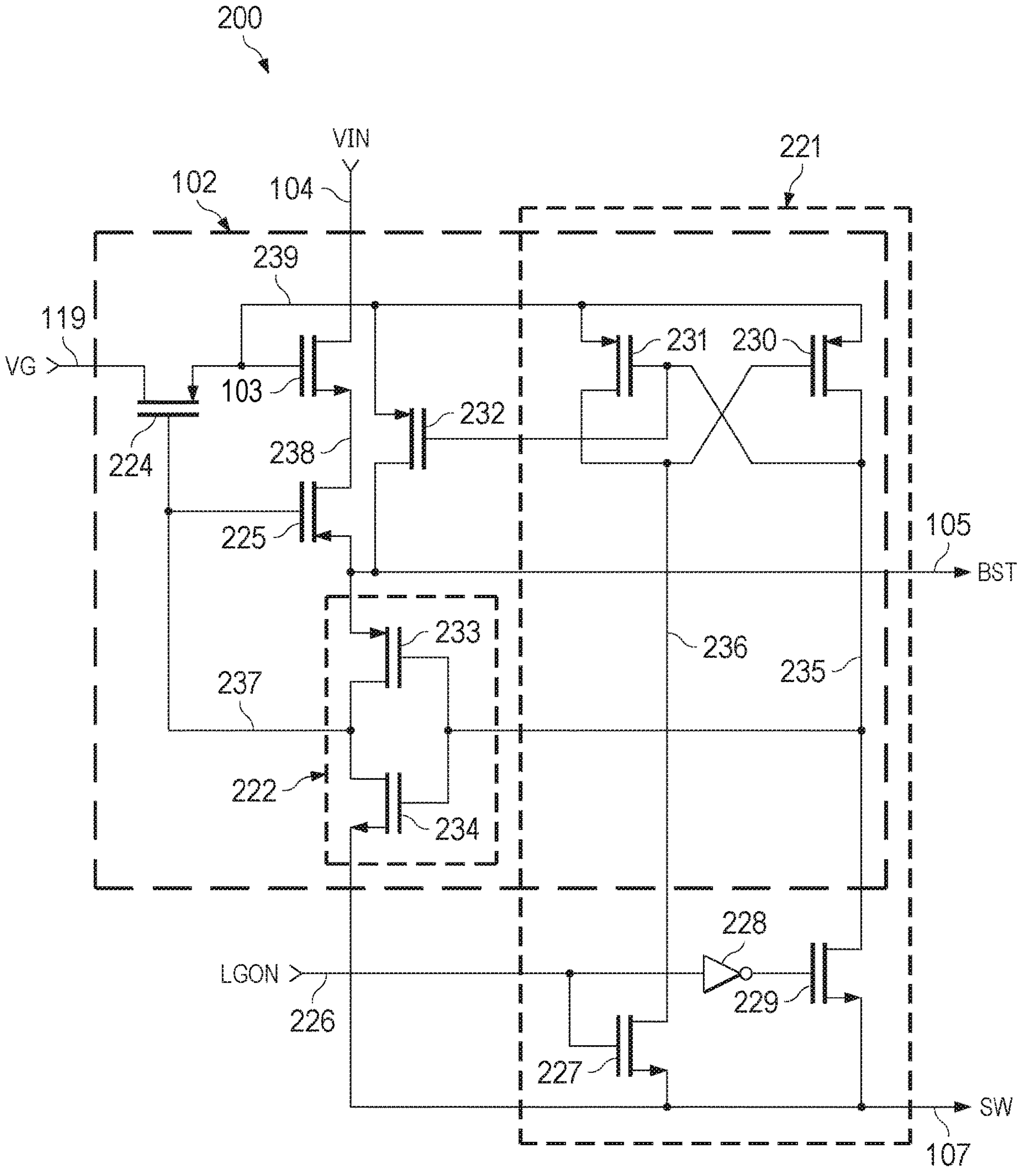
FIG. 2 is a schematic diagram illustrating an apparatus in accordance with some aspects of the present disclosure.

FIG. 2 is a schematic diagram illustrating an apparatus in accordance with some aspects of the present disclosure. The circuit of FIG. 2 comprises capacitor charging circuit 102. Capacitor charging circuit 102 comprises NFET 103. Capacitor charging circuit 102 can also comprise p-channel field-effect transistor (PFET) 224, PFET 225, PFET 232, PFET 231, PFET 230, and complementary metal-oxide semiconductor (CMOS) inverter 222. CMOS inverter 222 comprises PFET 233 and NFET 234. The circuit of FIG. 2 comprises a level shifter 221. Level shifter 221 comprises NFET 227, inverter 228, NFET 229, PFET 230, and PFET 231.

VIN terminal 104 is connected to a drain terminal of NFET 103. A source terminal of NFET 103 is connected to connection point 238, which is connected to a drain terminal of PFET 225. A source terminal of PFET 225 is connected to BST output terminal 105. BST output terminal 105 is connected to a drain terminal of PFET 232. A source terminal of PFET 232 is connected to connection point 239, which is connected to a gate terminal of NFET 103, to a source terminal of PFET 224, to a source terminal of PFET 230, and to a source terminal of PFET 231.

A low-side switch on signal is provided at low-side switch on (LGON) terminal 226. LGON terminal 226 is connected to a gate terminal of NFET 227 and to an input of inverter 228. An output of inverter 228 is connected to a gate terminal of NFET 229. A source terminal of NFET 227 is connected to SW output terminal 107. A source terminal of NFET 229 is connected to SW output terminal 107. A drain terminal of NFET 227 is connected to connection point 236, which is connected to a drain terminal of PFET 231 and to a gate terminal of PFET 230. A drain terminal of NFET 229 is connected to connection point 235, which is connected to a drain terminal of PFET 230, to a gate terminal of PFET 231, and to a gate terminal of PFET 232.

Connection point 235 is connected to an input of CMOS inverter 222. Within CMOS inverter 222, connection point 235 is connected to a gate terminal of PFET 233 and to a gate terminal of NFET 234. A source terminal of PFET 233 is connected to BST output terminal 105. A source terminal of NFET 234 is connected to SW output terminal 107. A drain terminal of PFET 233 is connected to a drain terminal of NFET 234 to provide an output of CMOS inverter 222, which is connected to connection point 237. Connection point 237 is connected to a gate terminal of PFET 224 and to a gate terminal of PFET 225. VG terminal 119 is connected to a drain terminal of PFET 224.

The low-side switch on signal at LGON terminal 226 can indicate, for example, when a low-aide switch is on, during which time the low-side switch may connect the SW output terminal 107 to ground terminal 111. In its active state, low-side switch on signal at LGON terminal 226 can cause NFET 227 to conduct, with inverter 228 causing NFET 229 not to conduct. With NFET 227 turned on and NFET 229 turned off, connection point 236 is brought close to the voltage of SW output terminal 107, which can cause PFET 230 to conduct. With PFET 230 conducting, connection point 235 is brought toward the voltage at connection point

239, which can cause PFET 231 and PFET 232 not to conduct and which can cause NFET 234 to conduct and PFET 233 not to conduct. With NFET 234 conducting, connection point 237 is brought toward the voltage of SW output terminal 107, which can cause PFET 224 and PFET 225 to conduct. With PFET 224 conducting, the voltage at VG terminal 119 is applied to connection point 239, where the voltage at VG terminal 119 can cause NFET 103 to conduct. With NFET 103 and PFET 225 conducting, current can flow from VIN terminal 104 to BST output terminal 105 to charge capacitor 106, which is connected between BST output terminal 105 and SW output terminal 107.

When the low-side switch on signal at LGON terminal 226 changes to its inactive state, it can cause NFET 227 not to conduct, with inverter 228 causing NFET 229 to conduct. With NFET 227 turned off and NFET 229 turned on, connection point 235 is brought close to the voltage of SW output terminal 107, which can cause PFET 231 and PFET 232 to conduct and which can cause PFET 233 to conduct and NFET 234 not to conduct. With PFET 231 conducting, connection point 236 is brought toward the voltage at connection point 239, which can cause PFET 230 not to conduct. With PFET 233 conducting, connection point 237 is brought toward the voltage of BST output terminal 105, which can cause PFET 224 and PFET 225 not to conduct. With PFET 224 not conducting, the voltage at VG terminal 119 is not applied to connection point 239. With PFET 232 conducting, the voltage at BST output terminal 105 is applied to connection point 239, which can cause NFET 103 not to conduct. With neither of NFET 103 nor PFET 225 conducting, the input voltage at VIN terminal 104 is not connected to BST output terminal 105.

Figure 3:
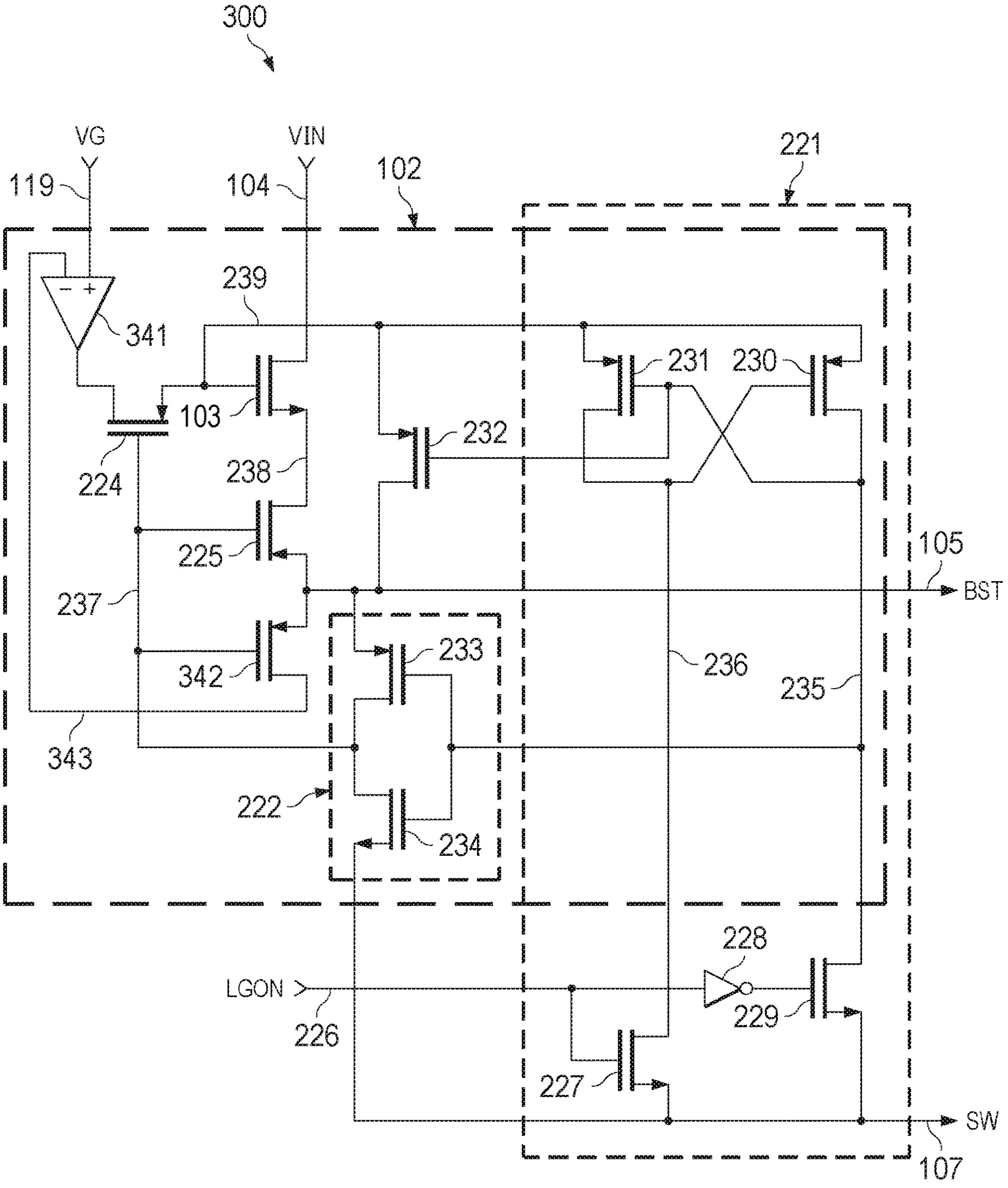
FIG. 3 is a schematic diagram illustrating an apparatus in accordance with some aspects of the present disclosure.

FIG. 3 is a schematic diagram illustrating an apparatus in accordance with some aspects of the present disclosure. Compared with FIG. 2, the circuit of FIG. 3 features the addition of PFET 342 and amplifier 341. A source terminal of PFET 342 is connected to BST output terminal 105. A gate terminal of PFET 342 is connected to connection point 237. A drain terminal of PFET 342 is connected to connection point 343, which is connected to an inverting input of amplifier 341. VG terminal 119 is connected to a non-inverting input of amplifier 341. An output of amplifier 341 is connected to the drain terminal of PFET 224. With the source terminal of PFET 342 connected to BST output terminal 105, PFET 342 allows the voltage at BST output terminal 105 to be sensed and disconnected. With the gate of NFET 103 controlled, via PFET 224, by amplifier 341, regulation of the voltage at BST output terminal 105 can be provided, regulating the voltage to which capacitor 106 is charged. Amplifier 341 can include a charge pump to drive NFET 103 into the triode region, which can reduce the size of NFET 103.

NFET 103, when on, connects VIN terminal 104 to BST output terminal 105 through PFET 225, which breaks the conductivity of body diode of NFET 103. LGON terminal 226 provides an active signal when a low-side switch connected to SW output terminal 107 of the converter is on. A level shifter comprises NFET 227, PFET 231, NFET 229, and PFET 230. The level shifter controls PFET 224 and PFET 232. PFET 224 connects the gate terminal of NFET 103 to VG terminal 119 (or to the output of amplifier 341 of FIG. 3) when NFET 103 is turned on. PFET 232 connects the gate terminal of NFET 103 to below its source terminal voltage in order to turn it off. BST output terminal 105 need not to have a non-zero voltage to start. In the case where BST output terminal 105 is initially zero volts or approximately so, the body diode of PFET 224 will power up the level shifter and turn NFET 103 on.

As shown in FIG. 3, PFET 342 can be provided so the bootstrap capacitor voltage can be sensed and disconnected. The gate terminal of NFET 103 can be controlled by amplifier 341 and hence allows regulation of the bootstrap capacitor voltage at BST output terminal 105. Amplifier 341 can have a charge pump and drive NFET 103 to its triode region, which can reduce the size of NFET 103. PFET 342 can be driven together with PFET 225 (e.g., their gate terminals can be connected together).

In accordance with some embodiments, NFET 103 can be formed as a NLDMOS transistor. As used herein, the phrase "length-to-width ratio" refers to a ratio of a measurement of a length of a gate area of a transistor to a measurement of a width of the gate area of the transistor. The term "length" refers to a distance across a gate area of a transistor in a direction running between the source and the drain of the transistor. The term "width" refers to a distance across the gate area of a transistor orthogonal to the direction of the length measurement. When a length-to-width ratio is expressed as n:1, for each unit of its width dimension, there are n units of its length dimension. In accordance with some embodiments, NFET 103 can be formed as a plurality of transistors in parallel with one another. As an example, NFET 103 can be formed from 2 to 50 transistors in parallel. As an example, NFET 103 can be formed from 5 to 30 transistors in parallel. As an example, NFET 103 can be formed from 10 to 20 transistors in parallel. As an example, NFET 103 can be formed from 13 to 17 transistors in parallel. As an example, NFET 103 can be formed from 15 transistors in parallel. In accordance with some embodiments, the individual transistors from which NFET 103 is formed may have a length-to-width ratio of 50:1 to 300:1. In accordance with some embodiments, the individual transistors from which NFET 103 is formed may have a length-to-width ratio of 75:1 to 200:1. In accordance with some embodiments, the individual transistors from which NFET 103 is formed may have a length-to-width ratio of 100:1 to 150:1. In accordance with some embodiments, the individual transistors from which NFET 103 is formed may have a length-to-width ratio of 110:1 to 140:1. In accordance with some embodiments, the individual transistors from which NFET 103 is formed may have a length-to-width ratio of 120:1 to 135:1. In accordance with some embodiments, the individual transistors from which NFET 103 is formed may have a length-to-width ratio of 125:1 to 130:1. In accordance with some embodiments, the individual transistors from which NFET 103 is formed may have a length-to-width ratio of 128:1. As used herein, the phrase "device length-to-width ratio" refers to the length-to-width ratio using the combined widths of individual transistors in parallel which a transistor may comprise. The sum of the widths of the individual parallel transistors is used as the width for the device length-to-width ratio. In accordance with some embodiments, a device length-to-width ratio, summing the widths of individual transistors in parallel, may be between 5:1 and 20:1 for NFET 103. In accordance with some embodiments, a device length-to-width ratio, summing the widths of individual transistors in parallel, may be between 7:1 and 15:1 for NFET 103. In accordance with some embodiments, a device length-to-width ratio, summing the widths of individual transistors in parallel, may be between 8:1 and 9:1 for NFET 103. In accordance with some embodiments, NFET 103 may have a length of between 50 to 300 micrometers (μm). In accordance with some embodiments, NFET 103 may have a length of between 75 to 200 μm. In accordance with some embodiments, NFET 103 may have a length of between 100 and 150 μm. In accordance with some embodiments, NFET 103 may have a length of between 110 and 140 μm. In accordance with some embodiments, NFET 103 may have a length of between 120 and 135 μm. In accordance with some embodiments, NFET 103 may have a length of between 125 and 130 μm. In accordance with some embodiments, NFET 103 may have a length of 128 μm. In accordance with some embodiments, individual transistors of NFET 103 may have a width of between 0.5 and 3 μm. In accordance with some embodiments, individual transistors of NFET 103 may have a width of between 0.75 and 2 μm. In accordance with some embodiments, individual transistors of NFET 103 may have a width of between 0.85 and 1.5 μm. In accordance with some embodiments, individual transistors of NFET 103 may have a width of between 0.9 and 1.2 μm. In accordance with some embodiments, individual transistors of NFET 103 may have a width of 1 μm. In accordance with some embodiments, NFET 103 may have a device area of between 1000 and 3000 square micrometers ($\mu m^2$). In accordance with some embodiments, NFET 103 may have a device area of between 1500 and 2500 square micrometers ($\mu m^2$). In accordance with some embodiments, NFET 103 may have a device area of between 1700 and 2100 $\mu m^2$. In accordance with some embodiments, NFET 103 may have a device area of between 1900 and 2000 $\mu m^2$. In accordance with at least one embodiment, each individual transistor from which NFET 103 is formed may have an area between 50 and 300 $\mu m^2$. In accordance with at least one embodiment, each individual transistor from which NFET 103 is formed may have an area between 75 and 200 $\mu m^2$. In accordance with at least one embodiment, each individual transistor from which NFET 103 is formed may have an area between 100 and 160 $\mu m^2$. In accordance with at least one embodiment, each individual transistor from which NFET 103 is formed may have an area between 110 and 150 $\mu m^2$. In accordance with at least one embodiment, each individual transistor from which NFET 103 is formed may have an area between 120 and 140 $\mu m^2$. In accordance with at least one embodiment, each individual transistor from which NFET 103 is formed may have an area between 125 and 135 $\mu m^2$. In accordance with at least one embodiment, each individual transistor from which NFET 103 is formed may have an area between 127 and 129 $\mu m^2$.

In accordance with some embodiments, PFET 225 can be formed as a PLDMOS transistor. In accordance with some embodiments, PFET 225 can be formed as a plurality of transistors in parallel with one another. As an example, PFET 225 can be formed from 10 to 100 transistors in parallel. As an example, PFET 225 can be formed from 20 to 60 transistors in parallel. As an example, PFET 225 can be formed from 30 to 50 transistors in parallel. As an example, PFET 225 can be formed from 35 to 45 transistors in parallel. As an example, PFET 225 can be formed from 40 transistors in parallel. In accordance with some embodiments, the individual transistors from which PFET 225 is formed may have a length-to-width ratio of 40:1 to 250:1. In accordance with some embodiments, the individual transistors from which PFET 225 is formed may have a length-to-width ratio of 50:1 to 200:1. In accordance with some embodiments, the individual transistors from which PFET 225 is formed may have a length-to-width ratio of 60:1 to 150:1. In accordance with some embodiments, the individual transistors from which PFET 225 is formed may have a length-to-width ratio of 70:1 to 130:1. In accordance with some embodiments, the individual transistors from which PFET 225 is formed may have a length-to-width ratio of 80:1 to 120:1. In accordance with some embodiments, the individual transistors from which PFET 225 is formed may have a length-to-width ratio of 90:1 to 110:1. In accordance with some embodiments, the individual transistors from which PFET 225 is formed may have a length-to-width ratio of 100:1. In accordance with some embodiments, a device length-to-width ratio, summing the widths of individual transistors in parallel, may be between 1:1 and 10:1 for PFET 225. In accordance with some embodiments, a device length-to-width ratio, summing the widths of individual transistors in parallel, may be between 1.5:1 and 5:1 for PFET 225. In accordance with some embodiments, a device length-to-width ratio, summing the widths of individual transistors in parallel, may be between 2:1 and 3:1 for PFET 225. In accordance with some embodiments, PFET 225 may have a length of between 30 to 150 micrometers (μm). In accordance with some embodiments, PFET 225 may have a length of between 40 to 120 μm. In accordance with some embodiments, PFET 225 may have a length of between 50 and 100 μm. In accordance with some embodiments, PFET 225 may have a length of between 55 and 90 μm. In accordance with some embodiments, PFET 225 may have a length of between 60 and 80 μm. In accordance with some embodiments, PFET 225 may have a length of between 65 and 75 μm. In accordance with some embodiments, PFET 225 may have a length of 70 μm. In accordance with some embodiments, individual transistors of PFET 225 may have a width of between 0.5 and 2 μm. In accordance with some embodiments, individual transistors of PFET 225 may have a width of between 0.55 and 1.5 μm. In accordance with some embodiments, individual transistors of PFET 225 may have a width of between 0.6 and 1 μm. In accordance with some embodiments, individual transistors of PFET 225 may have a width of between 0.65 and 0.8 μm. In accordance with some embodiments, individual transistors of PFET 225 may have a width of 0.7 μm. In accordance with some embodiments, PFET 225 may have a device area of between 1000 and 3000 square micrometers ($\mu m^2$). In accordance with some embodiments, PFET 225 may have a device area of between 1500 and 2500 square micrometers ($\mu m^2$). In accordance with some embodiments, PFET 225 may have a device area of between 1700 and 2100 $\mu m^2$. In accordance with some embodiments, PFET 225 may have a device area of between 1900 and 2000 $\mu m^2$. In accordance with at least one embodiment, each individual transistor from which PFET 225 is formed may have an area between 20 and 200 $\mu m^2$. In accordance with at least one embodiment, each individual transistor from which PFET 225 is formed may have an area between 30 and 150 $\mu m^2$. In accordance with at least one embodiment, each individual transistor from which PFET 225 is formed may have an area between 35 and 100 $\mu m^2$. In accordance with at least one embodiment, each individual transistor from which PFET 225 is formed may have an area between 40 and 60 $\mu m^2$. In accordance with at least one embodiment, each individual transistor from which PFET 225 is formed may have an area between 45 and 55 $\mu m^2$. In accordance with at least one embodiment, each individual transistor from which PFET 225 is formed may have an area between 48 and 50 $\mu m^2$.

Figure 4:
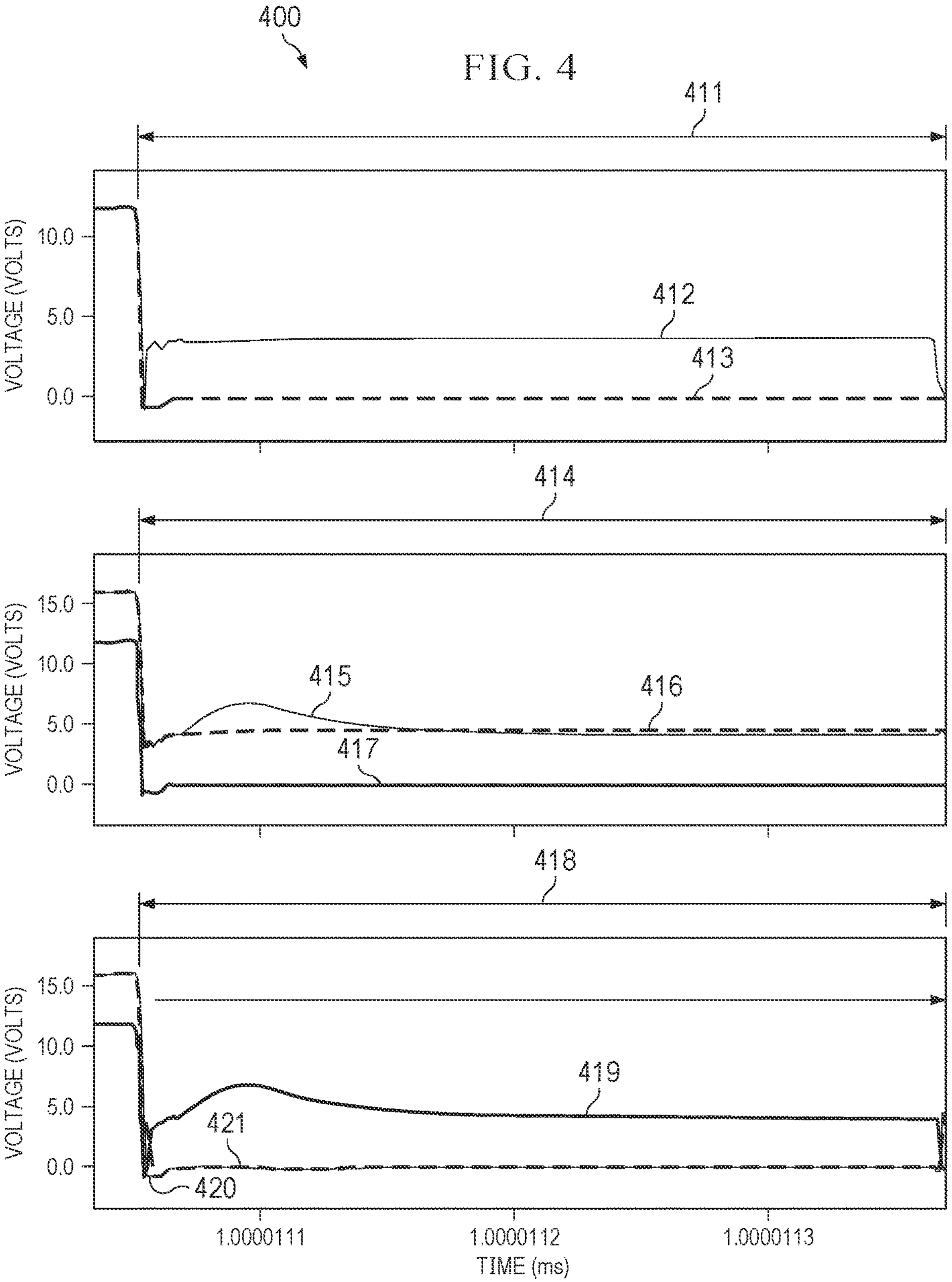
FIG. 4 is a timing diagram illustrating signals in accordance with some aspects of the present disclosure.

In FIGS. 3 and 4, NFET 103 and PFET 225 are in the capacitor charging path, which lies between VIN terminal 104 and BST output terminal 105. In accordance with some embodiments, the individual transistors from which NFET 103 is formed may have a length-to-width ratio of at least 25% greater than a length-to-width ratio of individual transistors of any other semiconductor device (e.g., transistor) in the capacitor charging path. In accordance with some embodiments, the individual transistors from which NFET 103 is formed may have a length-to-width ratio of at least 20% greater than a length-to-width ratio of individual transistors of any other semiconductor device in the capacitor charging path. In accordance with some embodiments, the individual transistors from which NFET 103 is formed may have a length-to-width ratio of at least 15% greater than a length-to-width ratio of individual transistors of any other semiconductor device in the capacitor charging path. In accordance with some embodiments, the individual transistors from which NFET 103 is formed may have a length-to-width ratio of at least 10% greater than a length-to-width ratio of individual transistors of any other semiconductor device in the capacitor charging path. In accordance with some embodiments, NFET 103 may have a device length-to-width ratio, summing the widths of individual transistors in parallel, of at least 3 times that of a length-to-width ratio of individual transistors of any other semiconductor device (e.g., transistor) in the capacitor charging path. In accordance with some embodiments, NFET 103 may have a device length-to-width ratio, summing the widths of individual transistors in parallel, of at least 2.5 times that of a length-to-width ratio of individual transistors of any other semiconductor device (e.g., transistor) in the capacitor charging path. In accordance with some embodiments, NFET 103 may have a device length-to-width ratio, summing the widths of individual transistors in parallel, of at least 2 times that of a length-to-width ratio of individual transistors of any other semiconductor device (e.g., transistor) in the capacitor charging path. In accordance with some embodiments, NFET 103 may have a device length-to-width ratio, summing the widths of individual transistors in parallel, of at least 1.5 times that of a length-to-width ratio of individual transistors of any other semiconductor device (e.g., transistor) in the capacitor charging path. In accordance with some embodiments, NFET 103 may have a length of at least 30% greater than any other semiconductor device (e.g., transistor) in the capacitor charging path. In accordance with some embodiments, NFET 103 may have a length of at least 40% greater than any other semiconductor device (e.g., transistor) in the capacitor charging path. In accordance with some embodiments, NFET 103 may have a length of at least 50% greater than any other semiconductor device (e.g., transistor) in the capacitor charging path. In accordance with some embodiments, NFET 103 may have a length of at least 60% greater than any other semiconductor device (e.g., transistor) in the capacitor charging path. In accordance with some embodiments, NFET 103 may have a length of at least 70% greater than any other semiconductor device (e.g., transistor) in the capacitor charging path. In accordance with some embodiments, NFET 103 may have a length of at least 80% greater than any other semiconductor device (e.g., transistor) in the capacitor charging path. In accordance with some embodiments, NFET 103 may have a device width, summing the widths of individual transistors in parallel, of 10% less than any other semiconductor device (e.g., transistor) in the capacitor charging path. In accordance with some embodiments, NFET 103 may have a device width, summing the widths of individual transistors in parallel, of 20% less than any other semiconductor device (e.g., transistor) in the capacitor charging path. In accordance with some embodiments, NFET 103 may have a device width, summing the widths of individual transistors in parallel, of 30% less than any other semiconductor device (e.g., transistor) in the capacitor charging path. In accordance with some embodiments, NFET 103 may have a device width, summing the widths of individual transistors in parallel, of 40% less than any other semiconductor device (e.g., transistor) in the capacitor charging path. In accordance with at least one embodiment, each individual transistor from which NFET 103 is formed may have an area between at least 2.5 times as large as an individual transistor of any other semiconductor device (e.g., transistor) in the capacitor charging path. In accordance with at least one embodiment, each individual transistor from which NFET 103 is formed may have an area between at least 2 times as large as an individual transistor of any other semiconductor device (e.g., transistor) in the capacitor charging path. In accordance with at least one embodiment, each individual transistor from which NFET 103 is formed may have an area between at least 1.5 times as large as an individual transistor of any other semiconductor device (e.g., transistor) in the capacitor charging path.

As used herein, the phrase "maximum tolerable drain-to-source voltage" refers to a maximum voltage potential that a field-effect transistor (FET) can tolerate between its drain terminal and its source terminal without incurring damage. In accordance with at least one embodiment, NFET 103 has a maximum tolerable drain-to-source voltage of at least 20 volts. In accordance with at least one embodiment, NFET 103 has a maximum tolerable drain-to-source voltage of at least 30 volts. In accordance with at least one embodiment, NFET 103 has a maximum tolerable drain-to-source voltage of at least 40 volts. In accordance with at least one embodiment, PFET 225 has a maximum tolerable drain-to-source voltage of no more than 5 volts. In accordance with at least one embodiment, PFET 225 has a maximum tolerable drain-to-source voltage of no more than 10 volts. In accordance with at least one embodiment, PFET 225 has a maximum tolerable drain-to-source voltage of no more than 20 volts. To avoid damage to a PFET 225, its drain voltage at its drain terminal, which is connected to the source terminal of NFET 103, should be continuously maintained within the maximum tolerable drain-to-source voltage of PFET 225 of the source voltage at its source terminal, which is connected to the capacitor terminal, which is BST output terminal 105.

Figure 5:
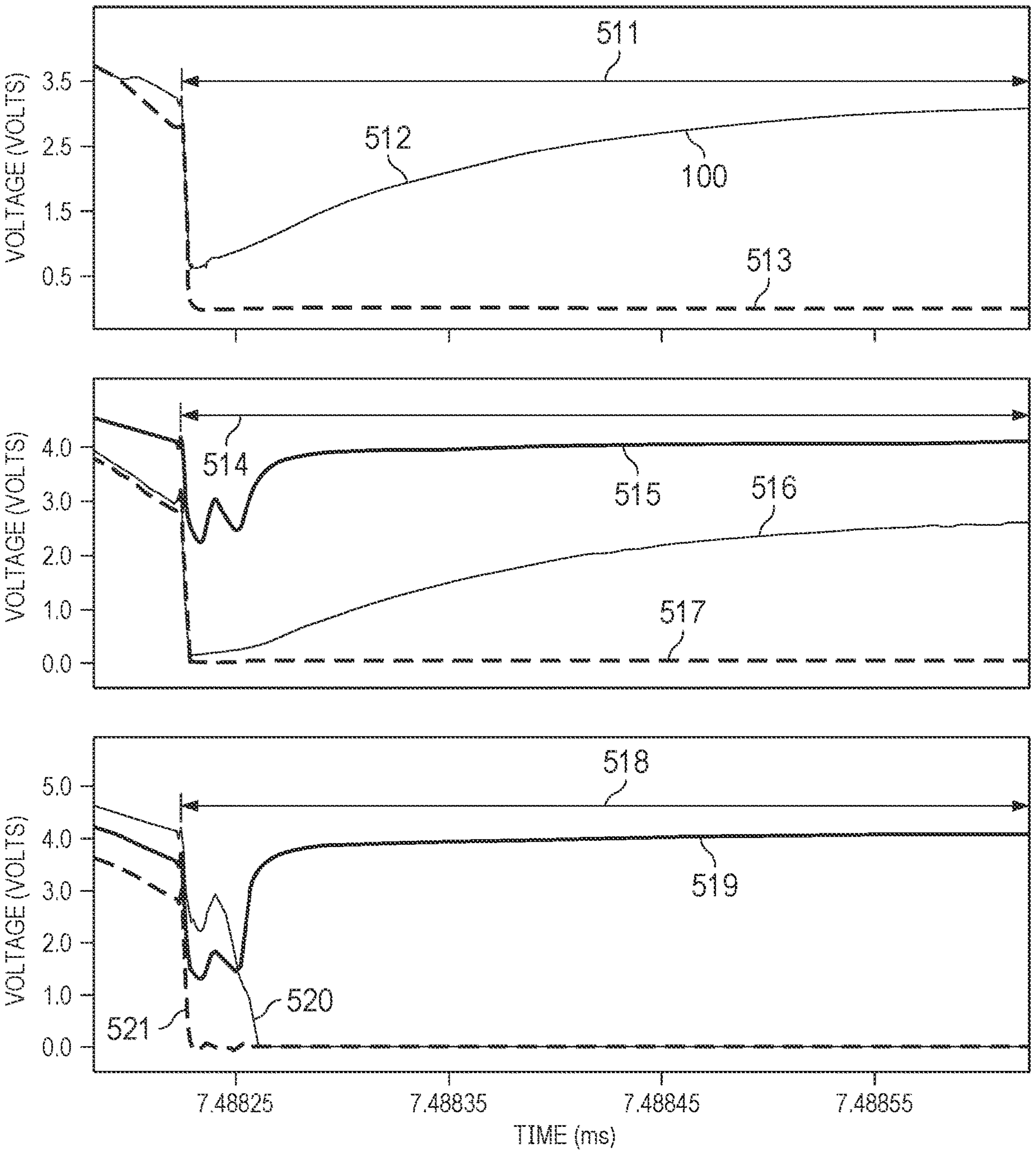
FIG. 5 is a timing diagram illustrating signals in accordance with some aspects of the present disclosure.

FIG. 4 is a timing diagram illustrating signals in accordance with some aspects of the present disclosure. In FIGS. 4 and 5, the signals illustrated are shown relative to the system ground (e.g., ground terminal 111). Because the circuit shown in FIGS. 2 and 3 utilize a floating supply voltage provided by the bootstrap capacitor (e.g., capacitor 106), which has a return path via SW output terminal 107, the signals are interpreted relative to the voltage of SW output terminal 107.

As a low-side switch turns on, LGON terminal 226 goes to its active state, causing the gate terminal of NFET 103 to be disconnected from the voltage at BST output terminal 105 and connected to the voltage at VG terminal 119 (or, in the case of the circuit of FIG. 3, the voltage provided by amplifier 341 based on the voltage at VG terminal 119). Amplifier 341 of FIG. 3 senses the voltage at BST output terminal 105 and drives the base terminal of NFET 103 until the voltage at BST output terminal 105 reaches a target voltage (e.g., several volts, such as nominally five volts). As the low-side switch turns off, the gate terminal of NFET 103 is disconnected from the voltage at VG terminal 119 (or, in the case of the circuit of FIG. 3, the voltage provided by amplifier 341 based on the voltage at VG terminal 119) and connected to the voltage at BST output terminal 105, turning off NFET 103.

The signals of FIG. 4 are plotted with respect to a horizontal time axis and a vertical voltage axis. During time period 411, a low-side switch is in an on state, providing conduction. The low-side switch on signal at LGON terminal 226, shown by waveform 412, begins at an elevated level (for example, around 12 volts), drops momentarily to approximately zero volts, then for the duration of time period 411, maintains a high logic level, for example, around 3.5 volts. After time period 411, the low-side switch on signal drops to a low logic level, for example, around zero volts. The voltage at SW output terminal 107, shown by waveform 413, begins at an elevated level (for example, around 12 volts) and drops, for at least the duration of time period 411, to a voltage of approximately zero volts.

In the middle of FIG. 4, waveforms of the signals at BST output terminal 105, VG terminal 119, and SW output terminal 107 are shown in relation to time period 414, during which a low-side switch is in an on state, providing conduction. The voltage at VG terminal 119, shown as waveform 415, begins at an elevated voltage, for example, around 16 volts, drops to an intermediate voltage, for example, around 3.5 volts, then rises above the voltage of waveform 416, for example, to around 7 volts, providing sufficient voltage to turn on NFET 103 to allow conduction for the charging of capacitor 106. As capacitor 106 charges, the voltage at VG terminal 119, shown as waveform 415, declines toward the voltage of waveform 416, allowing NFET 103 to turn off after capacitor 106 is sufficiently charged to provide an adequate bootstrap voltage. The voltage at BST output terminal 105, shown as waveform 416, begins at an elevated voltage and drops to an intermediate voltage, for example, around 3.5 volts, which it maintains for the duration of time period 414. The voltage at SW output terminal 107, shown as waveform 417, begins at an elevated voltage, for example, around 12 volts, and drops to approximately zero volts for the duration of time period 414.

In the lower portion of FIG. 4, voltages at connection points 235, 236, and 237 are shown respectively as waveforms 419, 420, and 421 over the duration of time period 418, during which a low-side switch is in an on state, providing conduction. The voltage at connection point 235, shown as waveform 419, begins at an elevated voltage, for example, around 12 volts, drops to an intermediate voltage, for example, around 3.5 volts, rises to a higher voltage, for example, around 7 volts, as NFET 103 is turned on to charge capacitor 106, then declines back toward the intermediate voltage as capacitor 106 charges. At the end of time period 418, waveform 419 falls to approximately zero volts. The voltage at connection point 236, shown as waveform 420, begins at an elevated voltage, drops to approximately zero volts, and remains at approximately zero volts for the duration of time period 418. The voltage at connection point 237, shown as waveform 421, begins at an elevated voltage, for example, around 16 volts, drops to approximately zero volts, and remains at approximately zero volts for the duration of time period 418. At the end of time period 418, waveform 421 rises to an intermediate voltage, for example, around 3.5 volts.

FIG. 5 is a timing diagram illustrating signals in accordance with some aspects of the present disclosure. The waveforms shown in FIG. 5 represent voltages of signals following capacitor 106 being initially uncharged (e.g., having an initial capacitor voltage of zero volts).

The signals of FIG. 5 are plotted with respect to a horizontal time axis and a vertical voltage axis. During time period 511, a low-side switch is in an on state, providing conduction. The low-side switch on signal at LGON terminal 226, shown by waveform 512, begins at an elevated level (for example, around 3.5 volts), drops momentarily to approximately 0.6 volts, then for the duration of time period 511, rises asymptotically to an intermediate voltage, for example, around three volts. The voltage at SW output terminal 107, shown by waveform 513, begins at an elevated level (for example, around 3.5 volts) and drops, for at least the duration of time period 511, to a low voltage, for example, around 0.2 volts.

In the middle of FIG. 5, waveforms of the signals at BST output terminal 105, VG terminal 119, and SW output terminal 107 are shown in relation to time period 514, during which a low-side switch is in an on state, providing conduction. The voltage at VG terminal 119, shown as waveform 515, begins at an elevated voltage, for example, around 4.5 volts, drops to an intermediate voltage, for example, around three volts, vacillates between about 2.2 and 3.0 volts, then rises, for example, to around 3.8 volts, providing sufficient voltage above the voltage of waveform 516 to turn on NFET 103 to allow conduction for the charging of capacitor 106, remaining around 3.8 volts for the duration of time period 514. The voltage at BST output terminal 105, shown as waveform 516, begins at an elevated voltage, for example, around four volts, and drops to approximately 0.1 volts, rising gradually over time period 514 to around 2.4 volts. The voltage at SW output terminal 107, shown as waveform 517, begins at an elevated voltage, for example, around four volts, and drops to approximately zero volts for the duration of time period 514.

In the lower portion of FIG. 5, voltages at connection points 235, 236, and 237 are shown respectively as waveforms 519, 520, and 521 over the duration of time period 518, during which a low-side switch is in an on state, providing conduction. The voltage at connection point 235, shown as waveform 519, begins at an elevated voltage, for example, around 4.3 volts, drops to an intermediate voltage, for example, around 1.5 volts, vacillates between 1.5 and 1.3 volts, then rises to a higher voltage, for example, around 3.9 volts. The voltage at connection point 236, shown as waveform 520, begins at an elevated voltage, for example, around 4.7 volts, drops to an intermediate voltage, for example, around 2.7 volts, vacillates between about 2.2 and 2.8 volts, then drops to approximately zero volts for the duration of time period 518. The voltage at connection point 237, shown as waveform 521, begins at an elevated voltage, for example, around 3.7 volts, drops to approximately zero volts, and remains at approximately zero volts for the duration of time period 518.

The voltages and times shown in FIGS. 4 and 5 are by way of illustration of an example. Embodiments may be implemented with different voltages and times.

Figure 6:
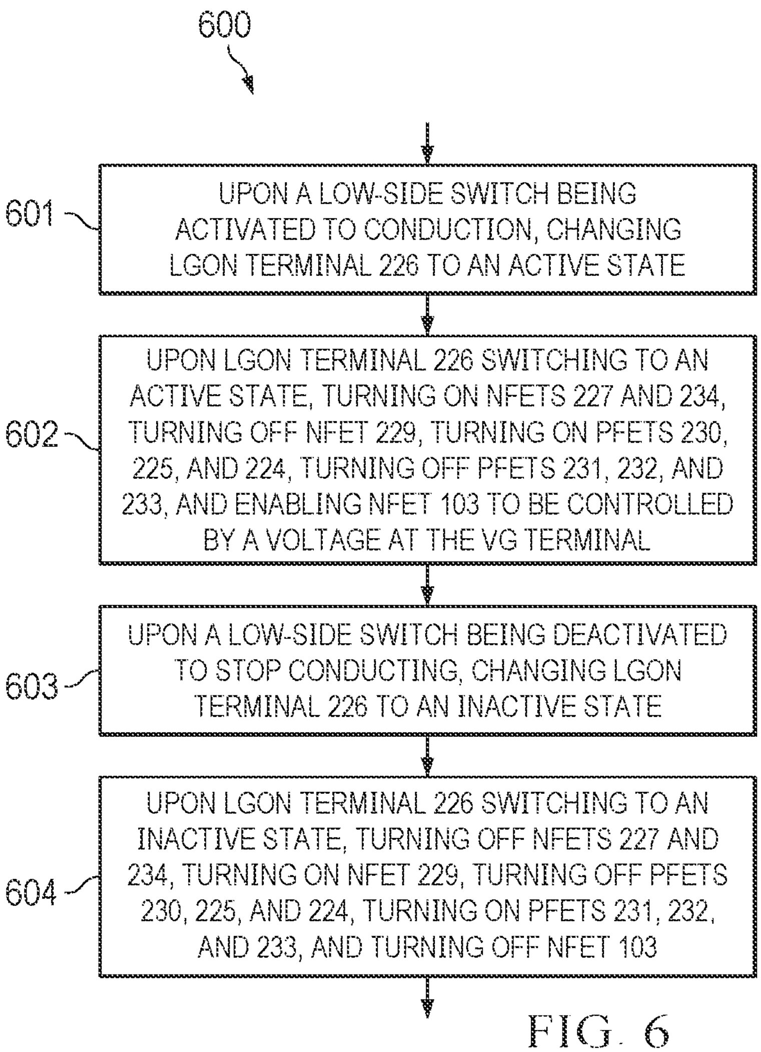
FIG. 6 is a flow diagram illustrating a method in accordance with some aspects of the present disclosure.

FIG. 6 is a flow diagram illustrating a method in accordance with some aspects of the present disclosure. Method 600 begins at block 601, where, upon a low-side switch being activated to conduction, LGON terminal 226 is changed to a voltage representing an active state. From block 601, method 600 continues to block 602. At block 602, upon LGON terminal 226 switching to an active state, NFETs 227 and 234 are turned on, NFET 229 is turned off, PFETs 230, 225, and 224 are turned on, PFETs 231, 232, and 233 are turned off, and NFET 103 is enabled to be controlled by a voltage at the VG terminal. From block 602, method 600 continues to block 603. At block 603, upon a low-side switch being deactivated to stop conducting, LGON terminal 226 is changed to an inactive state. From block 603, method 600 continues to block 604. At block 604, upon LGON terminal 226 switching to an inactive state, NFETs 227 and 234 are turned off, NFET 229 is turned on, PFETs 230, 225, and 224 are turned off, PFETs 231, 232, and 233 are turned on, and NFET 103 is turned off.

Figure 7:
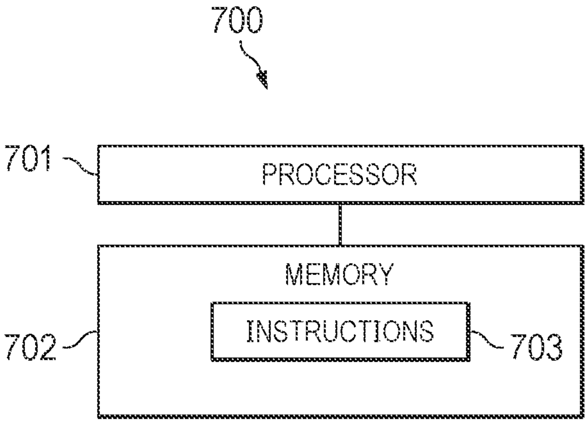
FIG. 7 is a block diagram illustrating a system in accordance with some aspects of the present disclosure.

FIG. 7 is a block diagram illustrating a system in accordance with some aspects of the present disclosure. System 700 comprises processor 701 and memory 702. Memory 702 stores instructions 703, which may be executed by processor 701. As an example, instructions 703 may comprise instructions to instantiate features of an apparatus, such as a circuit shown in FIG. 1, 2, or 3, in a computer-readable medium.

In some aspects, an integrated circuit comprises an input voltage terminal; a capacitor terminal; a first N-channel metal-oxide semiconductor (NMOS) transistor connected to the input voltage terminal; a first P-channel metal-oxide semiconductor (PMOS) transistor connected to a first NMOS gate terminal of the first NMOS transistor and connected to the capacitor terminal; a second PMOS transistor connected to the first NMOS gate terminal of the first NMOS transistor, the second PMOS transistor having a second PMOS gate terminal; a switched output terminal; a second NMOS transistor connected to the switched output terminal; a third NMOS transistor connected to the switched output terminal; an inverter, the inverter having an inverter input connected to a second NMOS gate terminal of the second NMOS transistor and an output connected to a third NMOS gate terminal of the third NMOS transistor; and a complementary metal oxide semiconductor (CMOS) transistor pair, the CMOS transistor pair having an input connected to the third NMOS transistor and an output connected to a second PMOS gate terminal of the second PMOS transistor, the CMOS transistor pair connected to the capacitor terminal and to the switched output terminal.

In some aspects, the integrated circuit further comprises a third PMOS transistor, the third PMOS transistor connected to the third NMOS transistor; a fourth PMOS transistor, the fourth PMOS transistor connected to the second NMOS transistor, the third PMOS transistor having a third PMOS gate terminal and the fourth PMOS transistor having a fourth PMOS gate terminal, the third PMOS transistor and the fourth PMOS transistor cross-coupled to form a latch.

In some aspects, the fourth PMOS gate terminal is connected to the first PMOS gate terminal.

In some aspects, the third PMOS transistor and the fourth PMOS transistor form a level shifter.

In some aspects, the integrated circuit further comprises a fifth PMOS transistor connected to the first NMOS transistor and to the capacitor terminal, the fifth PMOS transistor having a fifth PMOS gate terminal, the fifth PMOS gate terminal connected to the second PMOS gate terminal of the second PMOS transistor.

In some aspects, the first NMOS transistor is directly connected to the capacitor terminal.

In some aspects, the first NMOS transistor is a n-channel laterally diffused metal-oxide semiconductor (NLDMOS) transistor.

In some aspects, an integrated circuit comprises an input voltage terminal; a N-channel metal-oxide semiconductor (NMOS) transistor connected to the input voltage terminal, the NMOS transistor having a NMOS length and a NMOS device length-to-width ratio; a capacitor terminal circuit connected to the NMOS transistor, the capacitor terminal circuit comprising a capacitor terminal; and a first P-channel metal-oxide semiconductor (PMOS) transistor connected to a NMOS gate terminal of the NMOS transistor and to the capacitor terminal, the first PMOS transistor having a first PMOS gate terminal, the first PMOS transistor having a first PMOS length and a first PMOS device length-to-width ratio, the NMOS device length being at least 1.5 times as long as the first PMOS length.

In some aspects, the capacitor terminal circuit further comprises a second PMOS transistor connected between the NMOS transistor and the capacitor terminal, the second PMOS transistor having a second PMOS gate terminal, the second PMOS transistor having a second PMOS length and a second PMOS length-to-width ratio, the NMOS device length-to-width ratio being at least 2 times the second PMOS device length-to-width ratio.

In some aspects, the integrated circuit further comprises a third PMOS transistor connected to the NMOS gate terminal of the NMOS transistor, the third PMOS transistor having a third PMOS gate terminal, the second PMOS gate terminal connected to the third PMOS gate terminal, the third PMOS transistor having a third PMOS length and a third PMOS length-to-width ratio, the NMOS length-to-width ratio being at least 2 times the third PMOS length-to-width ratio.

In some aspects, the third PMOS transistor is configured, when conducting, to drive the NMOS transistor to conduction, and the first PMOS transistor is configured, when conducting, to inhibit conduction of the NMOS transistor.

In some aspects, the integrated circuit further comprises a complementary metal oxide semiconductor (CMOS) transistor pair having a CMOS input connected to a second NMOS transistor and a CMOS output connected to the second PMOS gate terminal and to the third PMOS gate terminal.

In some aspects, the CMOS transistor pair is connected to the capacitor terminal and to a switched output terminal, the switched output terminal connected to second NMOS transistor.

In some aspects, the integrated circuit of claim 8 wherein the NMOS transistor is a n-channel laterally diffused metal-oxide semiconductor (NLDMOS) transistor.

In some aspects, an integrated circuit comprises an input voltage terminal; a N-channel metal-oxide semiconductor (NMOS) transistor connected to the input voltage terminal, the NMOS transistor having a maximum tolerable drain-to-source voltage of at least 20 volts; and a capacitor terminal circuit connected to the NMOS transistor, the capacitor terminal circuit comprising a capacitor terminal, the capacitor terminal continuously maintained within 5 volts of a source terminal voltage of a source terminal of the NMOS transistor.

In some aspects, the capacitor terminal circuit further comprises a first P-channel metal-oxide semiconductor (PMOS) transistor connected between the NMOS transistor and the capacitor terminal, the first PMOS transistor having a first PMOS maximum tolerable drain-to-source voltage rating lower than a maximum tolerable drain-to-source voltage rating of the NMOS transistor.

In some aspects, the integrated circuit further comprises a second PMOS transistor connected to a NMOS gate terminal of the NMOS transistor, wherein a first PMOS gate terminal of the first PMOS transistor is connected to a second PMOS gate terminal of the second PMOS transistor.

In some aspects, the integrated circuit further comprises a third PMOS transistor connected to the NMOS gate terminal and to the capacitor terminal.

In some aspects, the integrated circuit further comprises a complementary metal oxide semiconductor (CMOS) transistor pair having a CMOS input connected to a high-side transistor and a CMOS output connected to the first PMOS gate terminal and to the second PMOS gate terminal.

In some aspects, the CMOS transistor pair is connected to the capacitor terminal and to a switched output terminal, the switched output terminal connected to the high-side transistor.

In some aspects, the integrated circuit of claim 15 wherein the NMOS transistor is a n-channel laterally diffused metal-oxide semiconductor (NLDMOS) transistor.

In some aspects, an integrated circuit comprises an input voltage terminal; a N-channel metal-oxide semiconductor (NMOS) transistor connected to the input voltage terminal; a semiconductor device connected to the NMOS transistor, the semiconductor device having a reverse voltage rating lower than a maximum tolerable drain-to-source voltage of the NMOS transistor; a capacitor terminal connected to the semiconductor device.

In some aspects, the semiconductor device, in an off state, is configured to block current flow in a direction of a NMOS body diode of the NMOS transistor.

In some aspects, the semiconductor device is a first P-channel metal-oxide (PMOS) transistor having a first PMOS body diode oriented opposite the NMOS body diode of the NMOS transistor.

In some aspects, the integrated circuit further comprises a second PMOS transistor connected to a NMOS gate terminal of the NMOS transistor, wherein a first PMOS gate terminal of the first PMOS transistor is connected to a second PMOS gate terminal of the second PMOS transistor.

In some aspects, the integrated circuit further comprises a closed-loop capacitor voltage control circuit connected to the second PMOS transistor.

In some aspects, the integrated circuit further comprises a fixed-voltage capacitor voltage control circuit connected to the second PMOS transistor.

In some aspects, the integrated circuit further comprises a third PMOS transistor connected to the NMOS gate terminal and to the capacitor terminal.

In some aspects, an apparatus comprises a processor; and a memory storing instructions, the instructions, when executed by the processor, causing the processor to instantiate an input voltage terminal; instantiate a N-channel metal-oxide semiconductor (NMOS) transistor connected to the input voltage terminal, the NMOS transistor having a maximum tolerable drain-to-source voltage of at least 20 volts; and instantiate a capacitor terminal circuit connected to the NMOS transistor, the capacitor terminal circuit comprising a capacitor terminal, the capacitor terminal continuously maintained within 5 volts of a source terminal voltage of a source terminal of the NMOS transistor.

In some aspects, the instructions, when executed by the processor, further cause the processor to instantiate the capacitor terminal circuit to include a first P-channel metal-oxide semiconductor (PMOS) transistor connected between the NMOS transistor and the capacitor terminal, the first PMOS transistor having a first PMOS maximum tolerable drain-to-source voltage rating lower than a maximum tolerable drain-to-source voltage rating of the NMOS transistor.

In some aspects, the instructions, when executed by the processor, further cause the processor to instantiate a second PMOS transistor connected to a NMOS gate terminal of the NMOS transistor, wherein a first PMOS gate terminal of the first PMOS transistor is connected to a second PMOS gate terminal of the second PMOS transistor.

In some aspects, the instructions, when executed by the processor, further cause the processor to instantiate a third PMOS transistor connected to the NMOS gate terminal and to the capacitor terminal.

In some aspects, the instructions, when executed by the processor, further cause the processor to instantiate a complementary metal oxide semiconductor (CMOS) transistor pair having a CMOS input connected to a high-side transistor and a CMOS output connected to the first PMOS gate terminal and to the second PMOS gate terminal.

In some aspects, the instructions, when executed by the processor, further cause the processor to instantiate the CMOS transistor pair to be connected to the capacitor terminal and to a switched output terminal, the switched output terminal connected to high-side transistor.

In some aspects, a non-transitory computer-readable storage medium stores instructions for execution by a processor, the instructions to cause the processor to instantiate an input voltage terminal; instantiate a N-channel metal-oxide semiconductor (NMOS) transistor connected to the input voltage terminal, the NMOS transistor having a maximum tolerable drain-to-source voltage of at least 20 volts; and instantiate a capacitor terminal circuit connected to the NMOS transistor, the capacitor terminal circuit comprising a capacitor terminal, the capacitor terminal continuously maintained within 5 volts of a source terminal voltage of a source terminal of the NMOS transistor. Optionally, the non-transitory computer-readable storage medium may store instructions to further cause the processor to instantiate the capacitor terminal circuit to include a first P-channel metal-oxide semiconductor (PMOS) transistor connected between the NMOS transistor and the capacitor terminal, the first PMOS transistor having a first PMOS maximum tolerable drain-to-source voltage rating lower than a maximum tolerable drain-to-source voltage rating of the NMOS transistor; to further cause the processor to instantiate a second PMOS transistor connected to a NMOS gate terminal of the NMOS transistor, wherein a first PMOS gate terminal of the first PMOS transistor is connected to a second PMOS gate terminal of the second PMOS transistor; to further cause the processor to instantiate a third PMOS transistor connected to the NMOS gate terminal and to the capacitor terminal; to further cause the processor to instantiate a complementary metal oxide semiconductor (CMOS) transistor pair having a CMOS input connected to a high-side transistor and a CMOS output connected to the first PMOS gate terminal and to the second PMOS gate terminal; or to further cause the processor to instantiate the CMOS transistor pair to be connected to the capacitor terminal and to a switched output terminal, the switched output terminal connected to high-side transistor.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory.

In this description, the term “couple” may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g., NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of that parameter. Modifications are possible in the described examples, and other implementations are possible, within the scope of the claims.

What is claimed is:

1. An integrated circuit comprising:

a power terminal;

a capacitor terminal;

a reference terminal;

an enable input;

a first transistor coupled between the power terminal and the capacitor terminal, the first transistor having a first control terminal;

a second transistor coupled between the first control terminal and the capacitor terminal, the second transistor having a second control terminal;

a third transistor coupled between the reference terminal and the first control terminal, the third transistor having a third control terminal;

circuitry coupled between the enable input and the second and third control terminals, the circuitry configurable to set the second and third control terminals to different states responsive to a state of the enable input.

2. The integrated circuit of claim 1, wherein:

the first transistor is a first N-channel metal-oxide semiconductor (NMOS) transistor;

the second transistor is a first P-channel metal-oxide semiconductor (PMOS) transistor;

the third transistor is a second P-channel metal-oxide semiconductor (PMOS) transistor;

the circuitry includes:

a switched output terminal;

a second NMOS transistor connected to the switched output terminal, the second NMOS transistor having a control terminal coupled to the enable input;

a third NMOS transistor connected to the switched output terminal;

an inverter coupled between the enable input and a control terminal of the third NMOS transistor;

a complementary metal oxide semiconductor (CMOS) transistor pair, the CMOS transistor pair having an input connected to the third NMOS transistor and an output connected to the third control terminal, the CMOS transistor pair connected between the capacitor terminal and the switched output terminal;

a third PMOS transistor, the third PMOS transistor connected to the third NMOS transistor; and a fourth PMOS transistor, the fourth PMOS transistor connected to the second NMOS transistor, the third PMOS transistor having a third PMOS gate terminal and the fourth PMOS transistor having a fourth PMOS gate terminal, the third PMOS transistor and the fourth PMOS transistor cross-coupled to form a latch.

3. The integrated circuit of claim 2, wherein the fourth PMOS gate terminal is connected to the second control terminal.

4. The integrated circuit of claim 3, wherein the third PMOS transistor and the fourth PMOS transistor form a level shifter.

5. The integrated circuit of claim 3 further comprising:

a fifth PMOS transistor connected to the first NMOS transistor and to the capacitor terminal, the fifth PMOS transistor having a fifth PMOS gate terminal, the fifth PMOS gate terminal connected to the third control terminal.

6. The integrated circuit of claim 3 wherein the first NMOS transistor is directly connected to the capacitor terminal.

7. The integrated circuit of claim 1 wherein the first transistor is a n-channel laterally diffused metal-oxide semiconductor (NLDMOS) transistor.

8. An integrated circuit comprising:

a power terminal;

a N-channel metal-oxide semiconductor (NMOS) transistor coupled to the power terminal;

circuitry coupled to the NMOS transistor, the circuitry having a capacitor terminal; and a P-channel metal-oxide semiconductor (PMOS) transistor coupled to a gate terminal of the NMOS transistor and to the capacitor terminal, the NMOS transistor having a length being at least 1.5 times as long as a length of the PMOS transistor.

9. The integrated circuit of claim 8, wherein the PMOS transistor is a first PMOS transistor, the circuitry further comprises a second PMOS transistor coupled between the NMOS transistor and the capacitor terminal, the NMOS transistor having a length-to-width ratio at least 2 times of a length-to-width ratio of the second PMOS transistor.

10. The integrated circuit of claim 9 further comprising:

a third PMOS transistor coupled to the gate terminal of the NMOS transistor, the second PMOS transistor having a gate terminal connected to a gate terminal of the third PMOS transistor, the NMOS transistor having a length-to-width ratio being at least 2 times of a length-to-width ratio of the third PMOS transistor.

11. The integrated circuit of claim 10 wherein the third PMOS transistor is configurable to enable the NMOS transistor, and the first PMOS transistor is configurable to disable the NMOS transistor.

12. The integrated circuit of claim 10, wherein the NMOS transistor is a first NMOS transistor, and the integrated circuit further comprises:

a complementary metal oxide semiconductor (CMOS) transistor pair having a CMOS input connected to a second NMOS transistor and a CMOS output connected to the gate terminals of the second and third PMOS transistors.

13. The integrated circuit of claim 12 wherein the CMOS transistor pair is coupled to the capacitor terminal and to a switched output terminal, the switched output terminal coupled to the second NMOS transistor.

14. The integrated circuit of claim 8 wherein the NMOS transistor is a n-channel laterally diffused metal-oxide semiconductor (NLDMOS) transistor.

15. An integrated circuit comprising:

a power terminal; and a N-channel metal-oxide semiconductor (NMOS) transistor and circuitry coupled between the power terminal and a capacitor terminal, the NMOS transistor having a maximum tolerable drain-to-source voltage rating of at least 20 volts, and the circuitry configurable to maintain a voltage of the capacitor terminal within 5 volts of a source terminal voltage of a source terminal of the NMOS transistor.

16. The integrated circuit of claim 15, wherein the circuitry further comprises a P-channel metal-oxide semiconductor (PMOS) transistor coupled between the NMOS transistor and the capacitor terminal, the PMOS transistor having a maximum tolerable drain-to-source voltage rating lower than the maximum tolerable drain-to-source voltage rating of the NMOS transistor.

17. The integrated circuit of claim 16, wherein the PMOS transistor is a first PMOS transistor, and the integrated circuit further comprises:

a second PMOS transistor coupled to a gate terminal of the NMOS transistor, wherein a gate terminal of the first PMOS transistor is coupled to a gate terminal of the second PMOS transistor.

18. The integrated circuit of claim 17 further comprising:

a third PMOS transistor coupled to the gate terminal of the NMOS transistor and to the capacitor terminal.

19. The integrated circuit of claim 18 further comprising:

a complementary metal oxide semiconductor (CMOS) transistor pair having a CMOS input coupled to a high-side transistor and a CMOS output coupled to the gate terminal of the first PMOS transistor and to the gate terminal of the second PMOS transistor.

20. The integrated circuit of claim 19 wherein the CMOS transistor pair is coupled to the capacitor terminal and to a switched output terminal, the switched output terminal connected to the high-side transistor.

* * * * *